United States Patent [19]

Yankov et al.

[11] Patent Number: 4,959,396
[45] Date of Patent: Sep. 25, 1990

[54] COMPOSITION FOR MICROPOROUS SEPARATORS AND METHOD FOR ITS PREPARATION

[75] Inventors: Lyuben K. Yankov; Stefka K. Filipova; Ivo Y. Zlatanov; Evgeni B. Budevski, all of Sofia, Bulgaria

[73] Assignee: Centralen Institute Po Chimitcheska Promishlenost, Sofia, Bulgaria

[21] Appl. No.: 469,699

[22] Filed: Jan. 23, 1990

Related U.S. Application Data

[63] Continuation of Ser. No. 131,148, Dec. 10, 1987, abandoned.

[51] Int. Cl.$^5$ .............. B01D 39/20; C08K 3/36; C08L 23/02; H01M 2/16
[52] U.S. Cl. ........................ 521/61; 521/64; 521/91; 521/143; 521/154; 523/212; 524/297; 524/377; 524/493; 524/586
[58] Field of Search .............. 521/61, 64, 91, 143, 521/154; 523/212; 524/297, 377, 493, 586

[56] References Cited

U.S. PATENT DOCUMENTS

| | | | |
|---|---|---|---|
| 3,351,495 | 11/1967 | Larsen et al. | 264/41 |
| 3,986,189 | 10/1976 | Biesen et al. | 346/149 |
| 4,166,753 | 9/1979 | Emblem et al. | 501/133 |
| 4,369,238 | 1/1983 | Hasegawa et al. | 429/253 |
| 4,654,281 | 3/1987 | Anderman et al. | 429/212 |
| 4,699,857 | 10/1987 | Giovannoni et al. | 429/204 |

FOREIGN PATENT DOCUMENTS 2169129 7/1986 United Kingdom .

Primary Examiner—Herbert J. Lilling
Attorney, Agent, or Firm—Klein & Vibber

[57] ABSTRACT

The composition comprises polyolefins, fillers and a plasticizer. It contains 0.2 to 20 wt. % etoxysiloxane, 5 to 60 wt. % polyolefin, 10 to 60 wt. % white black filler, and 10 to 75 wt. % polyethyleneglycol, petroleum oil or dioctylphtalate. The polyolefin can be high-density polyethylene with a melt index at a standard charging up to 6, superhigh-molecular polyethylene, polypropylene, or a mixture of polypropylene and polyethylene, or of high-density polyethylene and super-high-molecular polyethylene at as ratio of 0 to 100 wt. parts high-density polyethylene for every 100 wt. parts super-high-molecular polyethylene. The composition is prepared by treating the filler with etoxysiloxane at room temperature, then adding the polyolefin and the plasticizer to form a mixture, and then homogenizing the mixture in a cold state or with heating. With this composition are prepared microporous separators having an average pore size of below 0.05μ, and having high physicomechanical properties.

8 Claims, No Drawings

COMPOSITION FOR MICROPOROUS SEPARATORS AND METHOD FOR ITS PREPARATION

This is a continuation of application Ser. No. 131,148, filed Dec. 10, 1987, now abandoned.

FIELD OF THE INVENTION

The invention concerns a composition for microporous separators for storage batteries based on polyolefins and a method for its preparation.

It is known to use compositions of polyolefins, fillers, and plasticizers (pore forming agents) in the preparation of microporous separators in which the separator sheet is formed by a composition consisting of 40 to 100 vol. % high-molecular polyethylene (high-density) with melt index at standard charging 0–5.0; 0 –60 vol. % inactive filler; and 0–40 vol. % plasticizer (petroleum oil, polyethyleneglycols, dioctylphtalate and other (see West German Pat. DE No. 1,496,123). The sheet material is prepared by mixing the components, according to the known methods with heat or cold, and then it is formed by extrusion, calendering, injection moulding or other known methods. The plasticizer (pore forming agent is extracted from the sheet) with water or an organic solvent.

SUMMARY OF THE INVENTION

West German Pat. DE No. 1,496,123 teaches making a separator, the average pore size of which is 0.085 to 0.140$\mu$, wherein over 50% have a size under 0.5,$\mu$.

A serious drawback thereof is the relatively large average size of the pores and their wide distribution below 0.5$\mu$.

An object of the present invention is to provide a composition and a method for preparation of microporous separators wherein the average size of the pores is below 0.05$\mu$, and having better physico-mechanicals parameters in using them to achieve a polyolefin with a melt index at a standard charging of 0.0 to 6.0.

This object is attained by providing a composition and developing a method for manufacture of microporous separators based on polyolefins, fillers and plasticizers. The composition comprises 0.2 to 20 wt. % ethoxysiloxane, which is an ethyl ester of orthosilicon acid and is more precisely described as tetraethoxysiloxane or the product of partial condensation, ethoxypolysiloxane, 5 to 60 wt. % polyolefin, 10 to 60 wt. % white black filler, consisting of $SiO_2$ with particle size smaller than 20 microns, specific surface greater than 175 $m^2/g$ and oil adsorption greater than 150 g/100 and 10 to 75 wt. % plasticizer, in this case polyethyleneglycol, petroleum oil or dioctylphtalate.

The polyolefin can be a high-density polyethylene with a melt index at standard charging up to 6, superhigh-molecular polyethylene, polypropylene or a mixture of polypropylene and polyethylene or high-density polyethylene and superhigh-molecular polyethylene at a ratio of 0 to 100 wt. parts high-density polyethylene, for 100 wt. parts super high-molecular polyethylene.

This composition is prepared by treating, with etoxysiloxane, the inactive filler at room temperature in a mixer for powderous materials for 60 minutes. The silanized filler is then mixed in the same mixer, or in a mixer with heating (130° to 160°C.), with polyolefin and plasticizer in order to obtain a homogenous powderous or melt mass. The mixing time in a cold mixer is 5 to 60 minutes, while in a heated mixer it is 15 to 30 minutes.

The powderous composition, or the grinded melt mixture, is then extruded in a double-worm extruder through a flat head in the form of a strip with a requested profile or by pressing. The sheet material is extracted with water or organic solvents depending on the kind of plasticizer during 20 minutes up to 20 hours at a temperature of from 20 to 60°C.

The main advantage of the presently claimed composition, and method for its preparation, is the possibility of preparing separator sheets having an average pore size below 0.05$\mu$ (mainly 0.03 to 0.045$\mu$) with a very narrow pore distribution wherein over 80% are with a size up to 0.1$\mu$; 10 to 15% have a size 0.1 to 0.5$\mu$; 2% to 3% with a size 0.5 to 1.0$\mu$; and 0 to 1% have a size 1 to 10$\mu$. The separator sheet has improved physicomechanical properties, thus allowing for drawing and orientating of the material in using polyethylene with melt index up to 6.

EXAMPLES

The invention is illustrated by the following examples:

EXAMPLE 1

1. Polyethylene, high-density BULEN-III group with melt index at standard charging 2.5.
2. Superhigh-molecular polyethylene BULEN- with melt index at standard charging 0.
3. Filler white (powdered silica with particle size smaller than 20 $\mu$) black VULCASYL S $Sio_2$.
4. Plasticizer -petroleum oil OK-1 having a viscosity index of 90 $\pm$2; kinematic viscosity of 100° of 20 $\pm$2 $m^2/s$ .$10^{-4}$; coke content, less than 0.45%; inflammation temperature over 245°.
5. Ethylsilicate (ES).

Initial mixture: 10% of substance 1; 5% of 2; 34% of 3; 49% of 4% and 2% of 5.

The white black filler and ethylsilicate are mixed in a mixer for powderous compositions and then are added to the mixture polyethylene and plasticizer. The thus obtained mixture is fed in a double-worm extruder provided with a flat head. The extrusion of flat strip is carried out at a temperature difference between the first and last zone of the extruder of 40°C., and temperature of the head being 175°C. The extruded sheet is extracted with tetrachlormethane for 60 minutes at a temperature of 20°C. The obtained separator strip has a strength of extension of 25 to 27 $kg/cm^2$, relative linear expansion at breaking of 300 to 350%, and of average pore diameter of 0.05$\mu$.

EXAMPLE 2

Initial mixture: 15% of substance 2; 34% of 3; 49% of 4; and 2% of 5. The method for preparing the separator is the same as in Example 1. The separator has a strength of extension of 50 to 55 $kg/cm^2$, relative linear expansion at breaking is 300 to 350%, and an average pore diameter is 0.04$\mu$.

EXAMPLE 3

Initial mixture according to Example 1 comprising 15% of substance 1; 34% of 3; 49% of 4 and 2% of 5. The method of processing is the same as in Example 1. The strength of extension of the separator is 27 to 28 $kg/cm^2$, the relative linear expansion at breaking is 180% to 200%, and the average pore diameter is 0.045μ.

EXAMPLE 4

The initial mixture has the quantitative ratio of Example 1 with the difference being that as a plasticizer is used dioctylphtalate. The method of processing is the same as in Example 1. The separator has a strength of extension 24 to 27 kg/cm$^2$, relative linear expansion at breaking of 20% to 40%, and an average pore diameter of 0.048μ.

EXAMPLE 5

The initial mixture is the same as in Example 1 with the difference that as a polyolefin is used a mixture of polyethylene and polypropylene (10% polyethylene, high-density and 5% polypropylene). The composition is prepared as in Example 1. The strength of extension is 26 to 28 kg/cm$^2$, the relative linear expansion is 150% to 180% and the average pore diameter is 0.05μ.

EXAMPLE 6

The initial mixture is as in Example 1 comprising 8% of substance 1; 2% of 2; 35% of 3; 45% of 4 and 10% of 5. The method of preparing is the same as in Example 1. The tensile strength is 20 to 21 kg/cm$^2$, the relative linear expansion at breaking is 60% to 80% and the average pore diameter of 0.035μ.

EXAMPLE 7

The initial mixture comprises:
1. Polyethylene high-density BULEN -III group with melt index at standard charging 2.5% to 28%.
2. Filler white black VULCASYL S Sio$_2$ —28%.
3. Plasticizer polyethyleneglycol "POLYOX —400" —39%.
4. Supplementary cross-linking component "ETHYLSILICATE —40 " —5%.

The white black filler and the ethylsilicate are mixed in a ball mill and thereafter are added polyethylene and the plasticizer. The thus obtained mixture is melted in a "Benber" mixer at a temperature of 140°C. for 15 minutes. After cooling, the material is grinded to a particle size of from 2 to 2.5 mm. Model separators with thickness 0.8 mm were produced in a matrix at a temperature of 185°C. to 190°C. and thereafter the sheet is washed in water at 60°C. two times for 10 hours.

The separator has an average pore size 0.015μ; 84% of the pore are below 0.1μ and there are no pores over 10μ. The tensile strength is 20.5 kg/cm$^2$ and the linear expansion 0.8%.

EXAMPLE 8

The initial mixture is the same as in Example 7, and as a supplementary cross-linking agent is used-tetraetoxysilan in an amount of 5%. The treatment is as in Example 7. The separator thus prepared has an average pore size 0.016μ; the pores below 0.1μ are 83% and there are no pores having a size over 10μ.

EXAMPLE 9

The initial mixture comprises:
1. Polyethylene high-density -V group with melt index at standard charging 4.8% to 33%.
2. Filler white black "VULCASYL S Sio$_2$" — 33%.
3. Plasticizer —polyethylenglycol "POLYOX —400" —30%.
4. Supplementary cross-linking agent "ETHYLSILICATE —40" —4%.

The mixture is treated as in example 7. The obtained microporous separator has an average pore size of 0.03μ wherein 83% of the pores have a size below 0.1μ and there are no pores having a size over 10μ.

Although the invention is described and illustrated with reference to a plurality of examples thereof, it is to be expressly understood that it is in no way limited to the disclosure of such preferred examples but is capable of numerous modifications within the scope of the appended claims.

We claim:

1. A composition for preparing microporous separators comprising 5 to 60 wt % of a polyolefin; 10 to 60 wt % of a filler consisting of SiO$_2$ having a particle size smaller than 20 microns a specific surface greater than 175 m@/g and an oil adsorption greater than 150g/100: 10 to 75 wt. % of a plasticizer and 0.2 to 20 wt. % of an ethoxysiloxane.

2. A composition according to claim 1, comprising 5 to 60 wt. % of a polyolefin; 10 to 60 wt. % of an inactive filler consisting of SiO$_2$ having a particle size smaller than 20 microns, a specific surface of between 175 and 300 m$^2$/g and a density of between 1.95 and 2.25 g/cm$^3$ 10 to 75 wt. % of a plasticizer and 0.2 wt. % of an ethoxysiloxane.

3. A composition according to claim 1, wherein said ethoxysiloxane is selected from the group consisting of tetraethoxysilane or ethoxypolysiloxane.

4. A composition according to claim 1, wherein said poyolefin is selected from the group consisting of high-density polyethylene having a melt index up to 6; super-high-molecular polyethylene, a mixture of high-density polyethylene and polypropylene, a mixture of high-density polyethylene and superhigh-molecular polyethylene.

5. A composition according to claim 1, wherein said plasticizer is selected from the group consisting of oil, dioctylphtalate, polyethyleneglycol, and mixtures thereof.

6. A process for preparing the composition according to claim 1, comprising the steps of:
  silanizing said filler with said ethoxysiloxane at room temperature;
  adding to said filler and ethoxysiloxane, said polyolefin and said plasticizer to form a mixture; and finally
  homogenizing said mixture at said temperature or by heating to about 130°C. to 160°C.

7. A microporous separator sheet prepared by the process of claim 6, said sheet having an average pore size below 0.05 microns and a narrow pore distribution, wherein over 80% of said pores have a size up to 0.1 microns; 10% to 15% have a size of 0.1 to 0.5 microns; 2 to 3% have a pore size of 0.5 to 1.0 microns and 0 to 1% have a size of 1 to 10 microns.

8. The sheet of claim 6, having a average pore size of 0.015 microns with about 84% of said pores having a size below 0.1 micron and no pores over 10 microns said sheet having a tensile strength of about 20.5 kg/cm$^2$ and a linear expansion of about 0.8%.

* * * * *